(12) United States Patent
Smith

(10) Patent No.: US 8,870,265 B2
(45) Date of Patent: Oct. 28, 2014

(54) TRAILER WITH IMPROVED AERODYNAMIC CHARACTERISTICS

(71) Applicant: Jeffrey P. Smith, Prosper, TX (US)

(72) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 13/838,881

(22) Filed: Mar. 15, 2013

(65) Prior Publication Data

US 2014/0265437 A1  Sep. 18, 2014

(51) Int. Cl.
B62D 35/00 (2006.01)

(52) U.S. Cl.
CPC .................................... *B62D 35/001* (2013.01)
USPC ....................................................... 296/180.4

(58) Field of Classification Search
CPC ............................... B62D 35/00; B62D 35/001
USPC .................................. 296/180.1, 180.4, 181.5
See application file for complete search history.

(56) References Cited

U.S. PATENT DOCUMENTS

| | | | |
|---|---|---|---|
| 4,269,444 A | 5/1981 | Emory | |
| 4,451,074 A | 5/1984 | Scanlon | |
| 4,702,509 A | 10/1987 | Elliott, Sr | |
| 5,094,503 A | 3/1992 | Dare-Bryan | |
| 5,498,059 A | 3/1996 | Switlik | |
| 6,092,861 A | 7/2000 | Whelan | |
| 6,286,894 B1 | 9/2001 | Kingham | |
| 6,394,533 B1 | 5/2002 | Ladell | |
| 6,666,498 B1 | 12/2003 | Whitten | |
| 8,025,329 B1 | 9/2011 | Kron | |
| 8,146,985 B2 * | 4/2012 | Nelson | 296/146.8 |
| 8,573,680 B2 * | 11/2013 | Smith | 296/181.5 |
| 2002/0030384 A1 | 3/2002 | Basford | |
| 2007/0001481 A1 | 1/2007 | Breidenbach | |
| 2007/0046066 A1 | 3/2007 | Cosgrove | |
| 2007/0126261 A1 | 6/2007 | Breidenbach | |
| 2008/0061597 A1 | 3/2008 | Reiman | |
| 2008/0093886 A1 | 4/2008 | Nusbaum | |
| 2008/0303310 A1 | 12/2008 | Breidenbach | |
| 2008/0309122 A1 | 12/2008 | Smith | |
| 2010/0181799 A1 | 7/2010 | Ryan | |
| 2011/0272963 A1 | 11/2011 | Henderon | |

FOREIGN PATENT DOCUMENTS

| | | |
|---|---|---|
| WO | 2008/125863 A1 | 10/2008 |
| WO | 2012/010922 A1 | 1/2012 |

* cited by examiner

*Primary Examiner* — Joseph D Pape
(74) *Attorney, Agent, or Firm* — Christensen O'Connor Johnson Kindness PLLC

(57) ABSTRACT

Aerodynamically configured trailers are provided with a downwardly slanted top surface section positioned at the rear of the trailer. In use, the rearward cant or slope reduces the low-pressure region that trails the end of the trailer, thereby reducing pressure drag. Aerodynamically configured trailers are also provided that maintain standard cargo capacity in a first configuration, and can convert to a reduced cargo capacity in a second configuration. In some examples, a rear roll-up door of one or more configurations is provided to facilitate loading/unloading, etc.

7 Claims, 7 Drawing Sheets

TRAILER WITH IMPROVED AERODYNAMIC CHARACTERISTICS

BACKGROUND

Numerous means have been sought to improve the fuel-efficiency of moving bodies and, especially, moving bluff bodies by reducing their aerodynamic drag. In the field of surface transportation and, particularly in the long-haul trucking industry, even small improvements in fuel efficiency can reduce annual operating costs significantly. It is therefore advantageous in the design of a vehicle to reduce drag forces, thereby increasing the aerodynamic properties and efficiency of the vehicle.

The over-the-highway cargo-hauling tractor-trailer combination is one vehicle that experiences excessive aerodynamic drag. Generally described, tractor-trailer combinations typically include a tractor 18 having a so-called fifth wheel by which a box-like semi-trailer 24 may be attached to the tractor 18 by an articulated connection for transportation of the semi-trailer, as shown in FIG. 1.

It is well known that the aft ends of bluff bodies, such as trailers, are known to contribute significantly to aerodynamic drag, as evidenced by the formation of a wake 30 in the trailing region behind the trailer 24. The generation of the wake, formed by eddies, can be contributed to the shape of the conventional trailer, which is essentially a rectangular box having a flat, rectangular roof 38 and matching floor 40, along with flat, rectangular side panels 42. The fore and aft vertical surfaces 44 and 46 of such trailers are also generally flat rectangular surfaces. As such, current bluff bodies, such as trailer 24, which is suitable for use with tractors of the Class 8 type, suffer from a low-pressure zone at the rear of the trailer such that the air stream 50 suffers from early separation, resulting in a broad eddying wake 30 forming downstream of the separation, as best shown in FIG. 1. The net result is the creation of considerable aerodynamic drag.

Unfortunately, attempts to make the trailer shape more aerodynamic within the overall length of the trailer have been accompanied by reduced carrying capacity and interference during loading of the trailer. Additionally, attempts to make the rear of the trailer more aerodynamic, for example, by the addition of panels or inflatable bladders (not shown), can suffer from disadvantages such as added weight and a significant lengthening of the trailer, with associated reductions in fuel efficiency and more difficult handling characteristics.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a trailer is provided. The trailer includes trailer body that includes a forward section having generally planar top and bottom surfaces and a rearward section having a generally planar bottom surface and a slanting surface that extends downwardly from an rearward end of the planar top surface of the forward section as it extends rearwardly thereof such that an angle is generated between the forward section top surface and slanting surface.

In accordance with another aspect of the present disclosure, a convertible trailer is provided. The trailer includes a substantially planar front roof section, and a wedge-shaped hatch comprising a substantially planar top panel and two triangular side panels. The hatch is pivotally attached to the rear edge of the front roof section and is capable of pivoting between a selected range of motion comprising a raised position, a neutral position, and a lowered position.

In accordance with another aspect of the present disclosure, a trailer is provided. The trailer includes a substantially planar front roof section, and a roll-up door assembly comprising a roll-up door mounted on laterally disposed tracks and movable along the tracks between opened and closed positions. In some embodiments, in the closed position the roll-up door defines a substantially vertical rear wall of the trailer and a slanted roof surface section that is downwardly and rearwardly slanted with respect to the plane of the front roof section, and in the open position the roll-up door is maintained in the parallel tracks extending substantially parallel to the plane of the front roof section along the fore-aft axis of the trailer.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
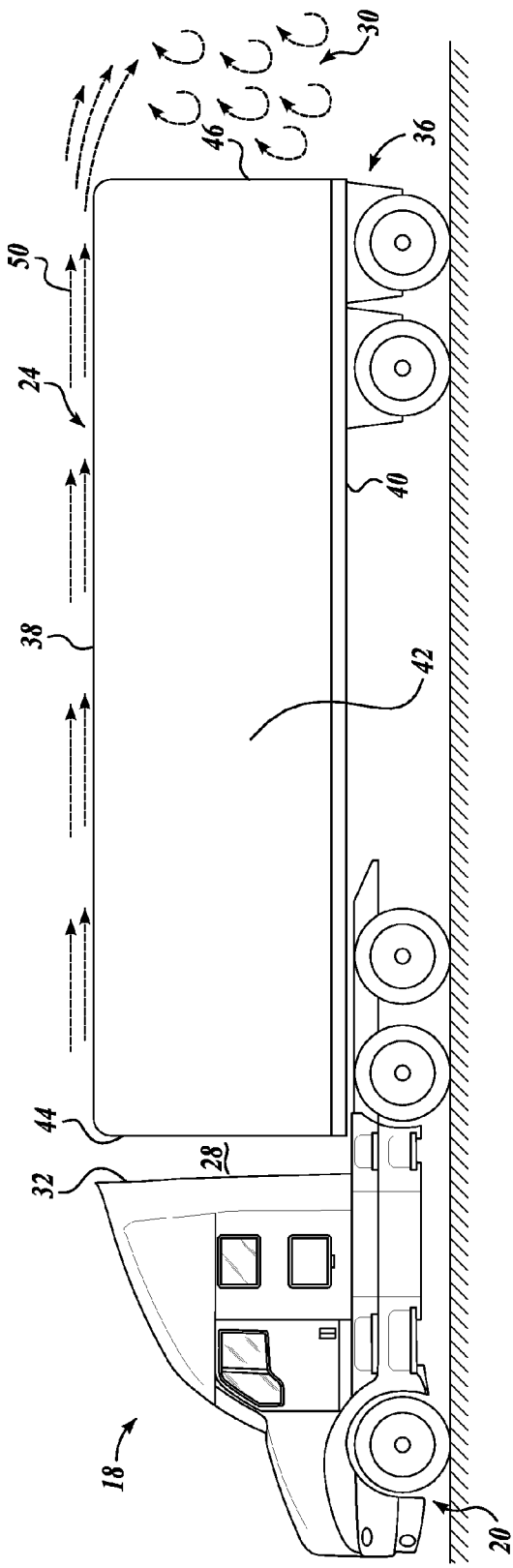
FIG. 1 is a side view of a prior art tractor-trailer combination showing the flow path of an air stream over the trailer thereof during movement of the vehicle.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following discussion provides examples of systems and methods for improving the aerodynamic efficiency (e.g., reduce drag) on vehicles, such as class 8 tractor-trailer combinations. In some examples, aerodynamically configured trailers are provided with a downwardly slanted top surface section (e.g., approximately 6-30 degrees in some embodiments and approximately 12-25 degrees in other embodiments) positioned at the rear of the trailer. In use, the rearward cant or slope reduces the low-pressure region that trails the end of the trailer, thereby reducing pressure drag. In some of these embodiments, the modified configured of the trailer may effect the cargo storage capacity. In an example, these trailers may hold approximately 22 full-height pallets disposed in substantially box-like front section and 1-4 shortened pallets disposed in the slanting rear section.

In other examples, aerodynamically configured trailers are provided that maintain standard cargo capacity in a first configuration, and can convert to a reduced cargo capacity in a second configuration. For example, in the first configuration, the trailer attains the configuration of a standard box-like trailer. In this first configuration, the cargo trailer is capable in some embodiments of holding up to approximately 26 full-height pallets. When an operator desires better fuel efficiency and can sacrifice some reduction in storage capacity, some examples of the trailer described herein can attain an "aero" configuration, in which the rear section of the trailer includes a downwardly slanting top surface. In the "aero" mode, the cargo trailer in some embodiments may hold approximately 22 full-height pallets disposed within the substantially horizontal front section and 1-4 shortened pallets disposed within the slanting rear section. In some examples, a rear roll-up door of one or more configurations is provided to facilitate loading/unloading, etc.

Although embodiments of the present invention will be described with reference to a semi-trailer, one skilled in the relevant art will appreciate that the disclosed embodiments are illustrative in nature, and therefore, should not be construed as limited to applications with a semi-trailer. It should therefore be apparent that the methods and systems of the present disclosure have wide application, and may be used in any situation where a reduction in the drag forces on a bluff body is desirable. It should be noted that for purposes of this disclosure, terminology such as "upper," "lower," "vertical," "horizontal," "fore," "aft," "inner," "outer," "front," "rear," etc., should be construed as descriptive and not limiting.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 2:
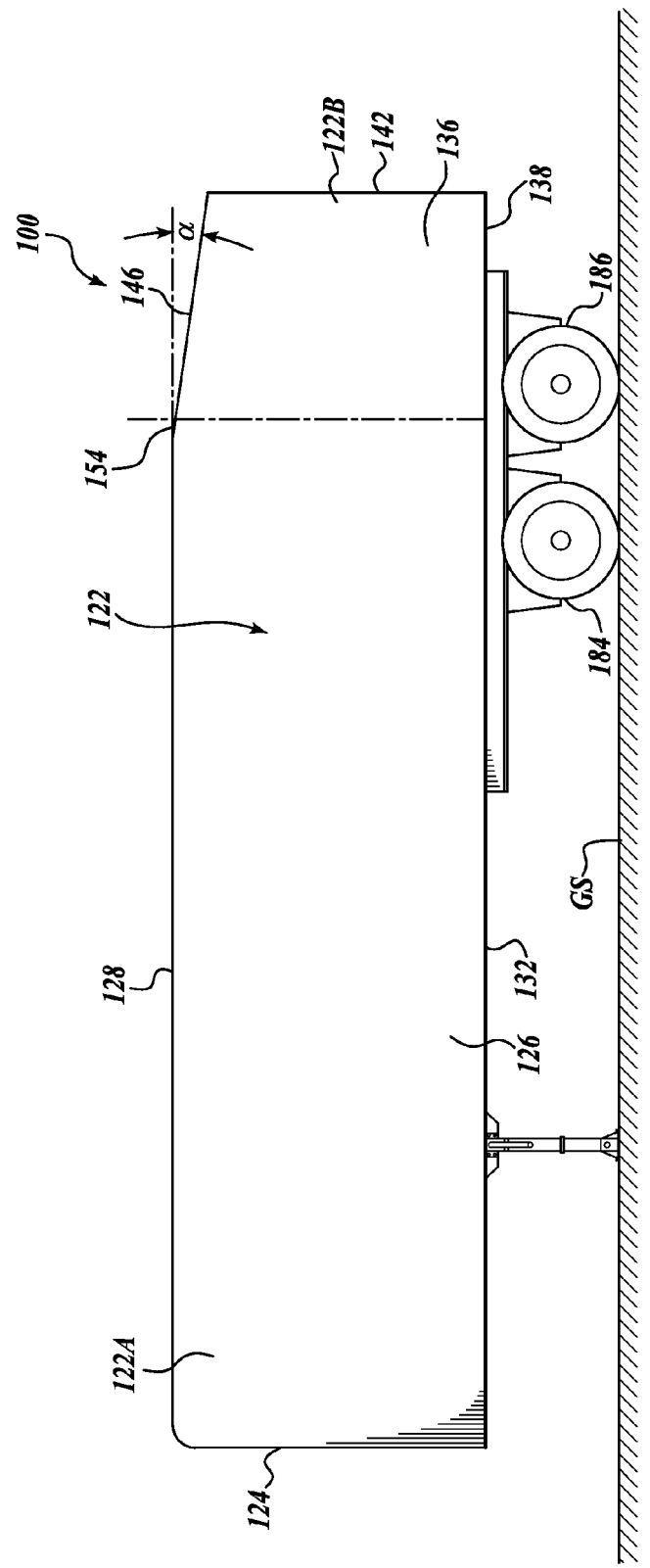
FIG. 2 is a side view of one example of a trailer constructed in accordance with aspects of the present disclosure.
Figure 4:
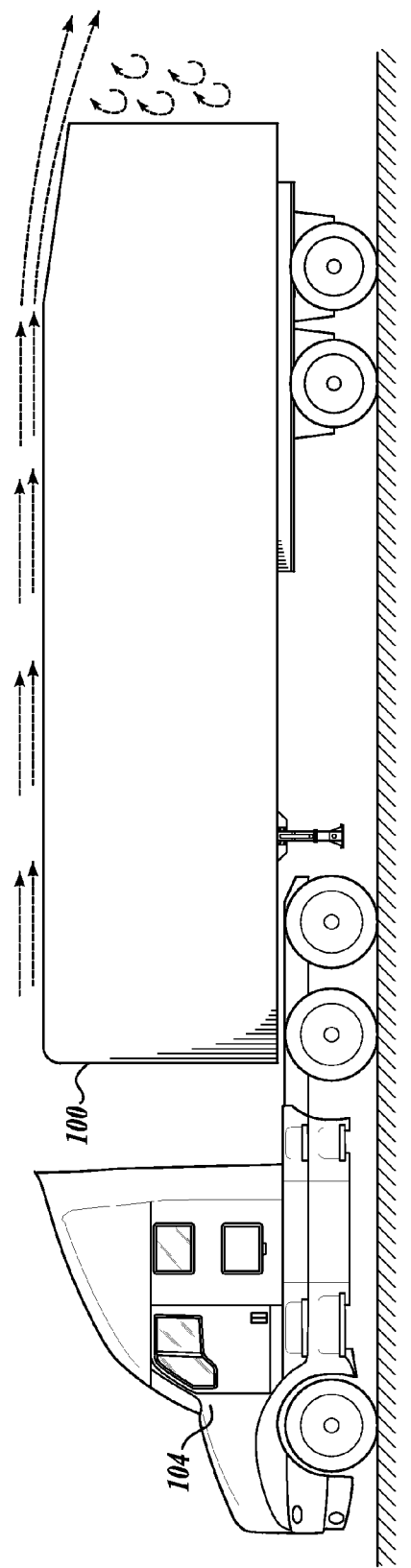
FIG. 4 is a side view of a tractor-trailer combination incorporating the trailer of FIG. 2 showing the flow path of an air stream over the trailer thereof during movement of the vehicle.

FIG. 2 illustrates one example of a drag reducing trailer 100 formed in accordance with aspects of the present disclosure. As best shown in FIG. 2, the trailer 100 is suitable for use with a pull vehicle, such as a Class 8 tractor shown in FIG. 4. During use, the configuration of the trailer 100 aids in the reduction of aerodynamic drag as compared to conventional box-like trailers, which is illustrated in FIG. 1. Further, as will be described in detail below, the trailer 100 in some embodiments may convert to a standard box-shaped trailer with full cargo capacity.

As best shown in FIG. 2, the trailer 100 includes a trailer body 122 having fore and aft adjoining body sections 122A and 122B that define a cargo carrying interior cavity (not shown). In the embodiment shown, the fore section 122A is generally rectangular in shape, having a generally planar, vertically oriented front end panel 124, generally planar, vertically oriented side panels 126, a top panel 128, and a generally planar, a bottom panel 132. On the other hand, the aft section 122B is generally trapezoidal in shape, having vertically oriented side panels 136, a generally planar, bottom panel 138 that extends co-planer with the bottom panel 132, a generally planar, rear end panel 142 with a height 20-50 percent less than the height of the front end panel 124, and a downwardly slanting top panel 146. As a result, an angle α is generated between the fore section top panel 128 and the aft section top panel 146. In some embodiments, the slanting top panel 146 may begin about 4-12 feet from the rear of the trailer (e.g., between 1-3 cargo pallets) and may end about 2-4 feet from the top of the trailer 100. Slant angles α can be around 6-30 degrees in some embodiments, while around 12-25 degrees in other embodiments. The aft section top panel 146 and/or the fore section top panel 128 in some embodiments can be slightly convex in shape.

While the top panels 128 and 146 are shown in FIG. 2 to respectively adjoin to form edge 154, it will be appreciated that other configurations are contemplated. For example, the transition from the top panel 128 to the top panel 146 may form a general convex curve.

Figure 3:
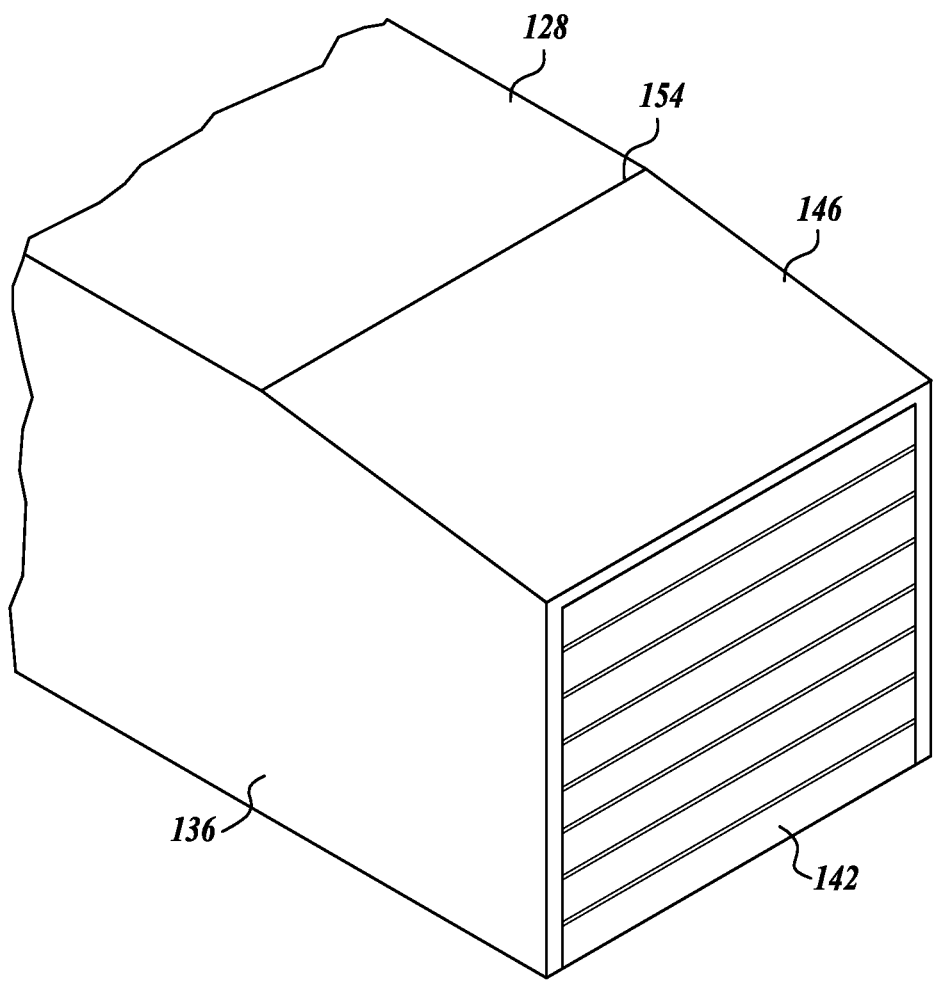
FIG. 3 is partial rear perspective view of the trailer of FIG. 2.
Figure 7:
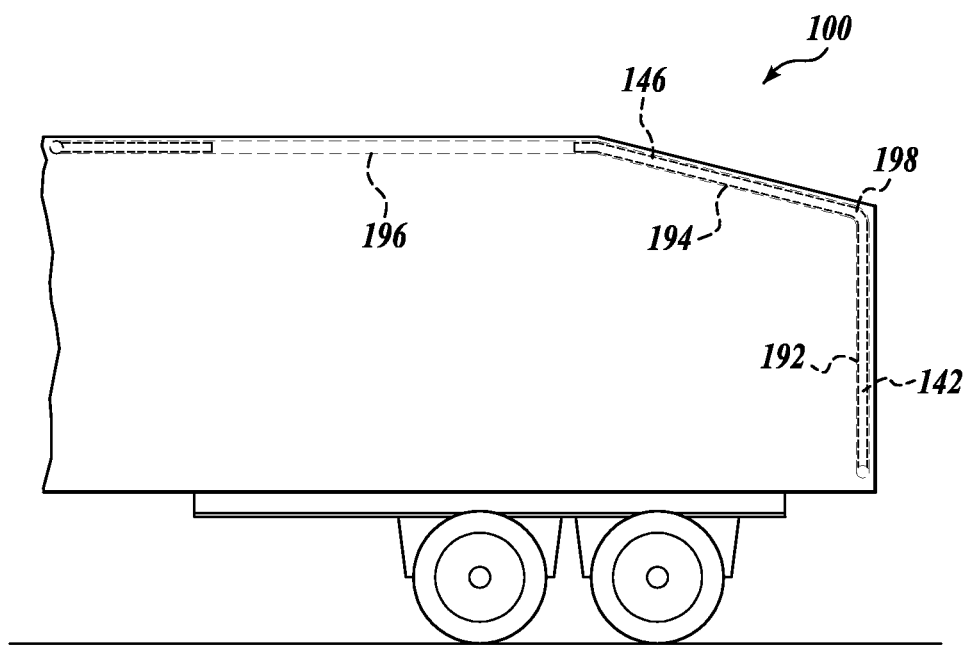
FIG. 7 is a partial side view of another example of a trailer constructed in accordance with aspects of the present disclosure.

The rear panel 142, which is usually represented by a door for permitting access to the interior cavity of the trailer, can have one or many configurations. In some embodiments, the rear panel 142 can include two side-by-side doors that pivot about vertically oriented hinges at the rear edges of the side panels 136. In another embodiment, the rear panel can include a "roll-up" style door, which stows/deploys along laterally disposed tracks (hidden in FIG. 3), as shown in FIG. 3. In some embodiments, the rear panel 142 and the slanting top panel 146 can together be configured as a "roll-up" style door, as best shown in the side view of FIG. 7. In this embodiment, the tracks extend along vertical sections 192, slanting sections 194, and horizontal sections 196. To facilitate movement, the rear panel 142 and the slanting top panel 146 are hingedly coupled at opposing lateral edges 198.

Figure 5A:
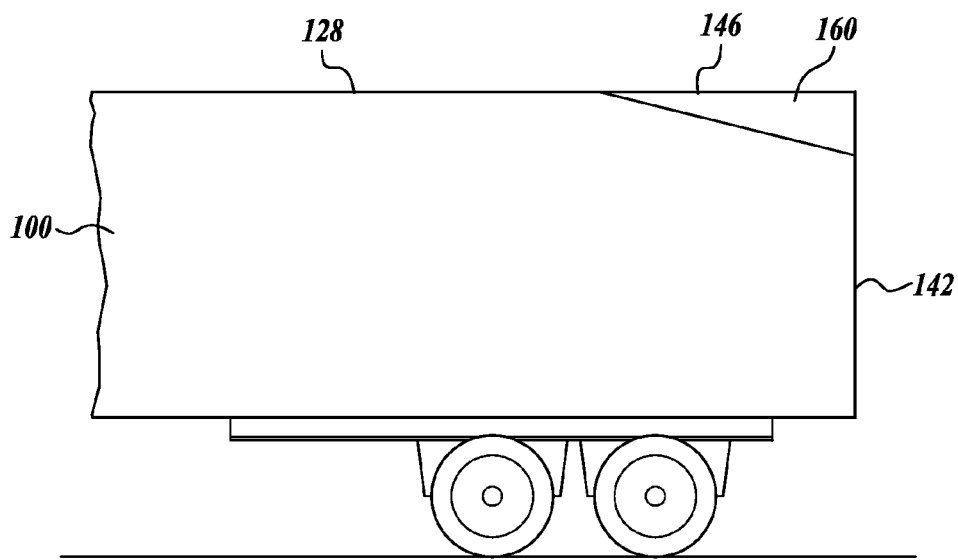
FIGS. 5A-C are side view of another embodiment of the trailer constructed in accordance with aspects of the present disclosure, which depict examples of a "standard" configuration, a cargo loading position, and an "aero" configuration.
Figure 5B:
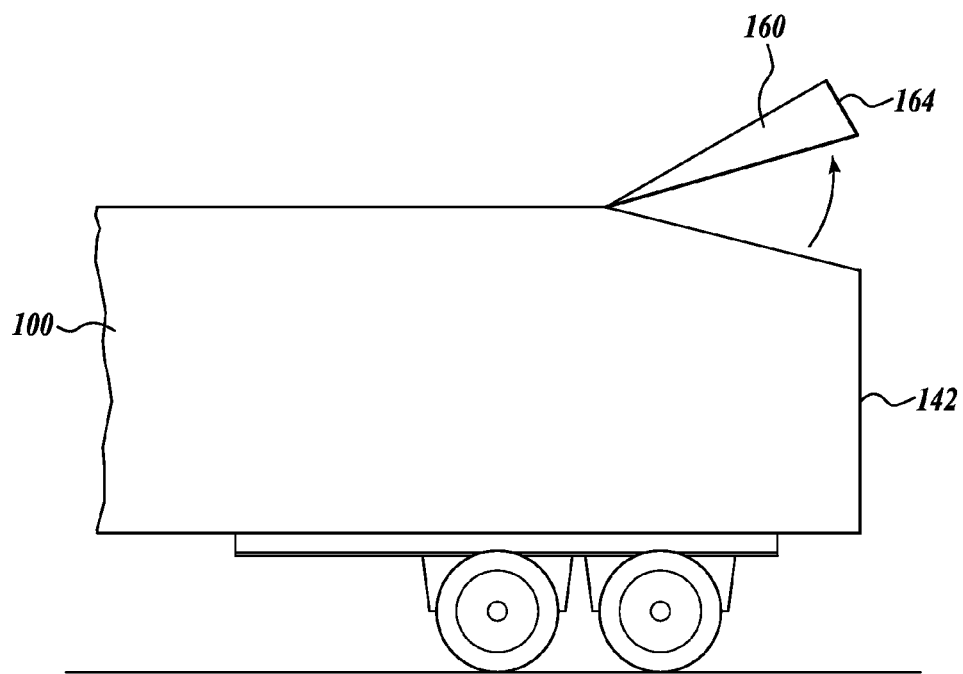
Figure 5C:
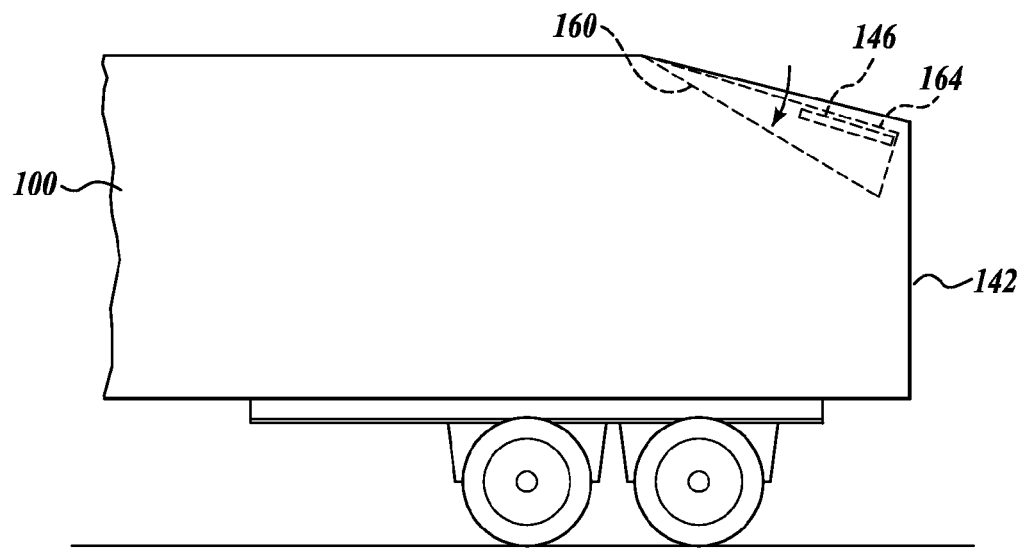
Figure 6:
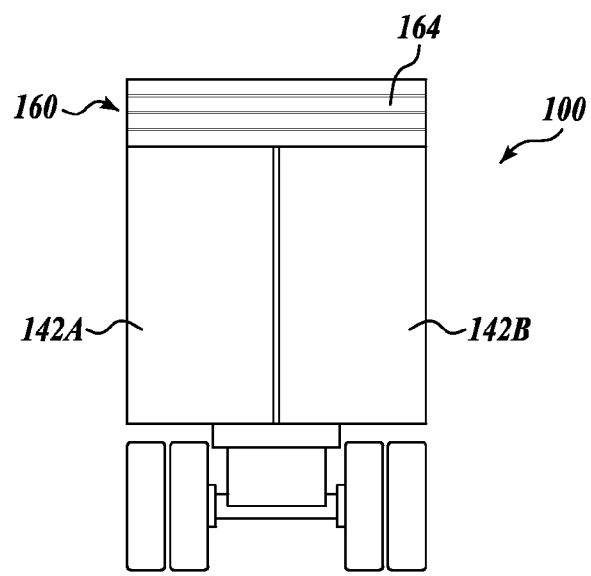
FIG. 6 is a rear view of the trailer of FIG. 5A.

In accordance with aspects of the present disclosure, the slanting top panel 146 of the trailer can be formed by a wedge-shaped hatch 160 pivotally coupled to the edge 154, as shown in FIGS. 5A-5C. In these embodiments, the hatch 160 can pivot upwardly along the edge 154 in order to load the trailer 100, as shown in FIG. 5B. The hatch 160 may then transition back to the "standard" configuration, as shown in FIG. 5A, or convert to the "aero" configuration, as shown in FIG. 5C. In this regard, the side panels of the hatch are configured to drop interiorly of the trailer side panel sections 136 when in the "aero" configuration, and are configured to be supported by the trailer side panel sections 136 when in the "standard" configuration. In the "standard" configuration, the hatch 160 may also be supported by the rear cargo doors 142A and 142B, as shown in FIG. 6.

In the embodiment of FIGS. 5A-5C and 6, the hatch 160 may include a roll-up door 164. The roll-up door 164 and the rear doors 142A and 142B together form a vertical wall at the rear of the trailer in the standard configuration. In the "aero" configuration of FIG. 5C, the roll-up door 164 rolls up and parallel with the top surface of the hatch 164, thus eliminating any interference with the cargo.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A trailer comprising:
   a trailer body that includes:
   a generally planar bottom surface extending from a forward end of the trailer body to a rearward end of the trailer body;
   a top surface having a generally planar top forward surface and a generally planar top rearward surface, wherein the top forward surface extends from the forward end of the trailer body substantially parallel to the bottom surface, and wherein the top rearward surface extends downwardly from a rearward end of the top forward surface to the rearward end of the trailer body such that an angle is generated between the top forward surface and the top rearward surface; and
   side walls extending from the top forward surface to the bottom surface in a forward section and extending from the top rearward surface to the bottom surface in a rearward section.

2. The trailer of claim 1, wherein the rearward section includes a rear panel that extends downwardly from a rearward edge of the rearward top exterior surface to a rearward edge of the rearward bottom exterior surface.

3. The trailer of claim 2, wherein the rear panel includes a door.

4. The trailer of claim 3, wherein the door includes two door sections hingedly coupled to the lateral vertical edges of the rearward section.

5. The trailer of claim 3, wherein the door is configured as a roll-up door.

6. The trailer of claim 2, wherein a panel that defines the rearward top exterior surface and the rear panel form a door configured to provide ingress to the interior of the trailer.

7. The trailer of claim 6, wherein the door is configured as a roll-up door that cooperates with first and second laterally disposed tracks for providing a closed position and an open position.

* * * * *